United States Patent
Takeda et al.

(10) Patent No.: US 11,218,268 B2
(45) Date of Patent: Jan. 4, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/495,531

(22) PCT Filed: Mar. 23, 2017

(86) PCT No.: PCT/JP2017/011892
§ 371 (c)(1),
(2) Date: Sep. 19, 2019

(87) PCT Pub. No.: WO2018/173235
PCT Pub. Date: Sep. 27, 2018

(65) Prior Publication Data
US 2020/0014517 A1    Jan. 9, 2020

(51) Int. Cl.
*H04L 5/00* (2006.01)
*H04L 5/02* (2006.01)
(Continued)

(52) U.S. Cl.
CPC .......... *H04L 5/0053* (2013.01); *H04L 5/0007* (2013.01); *H04L 5/0094* (2013.01); *H04L 5/023* (2013.01)

(58) Field of Classification Search
CPC ..... H04L 5/0053; H04L 5/023; H04L 5/0094; H04L 5/0007; H04L 5/0082;
(Continued)

(56) References Cited

U.S. PATENT DOCUMENTS

2014/0376502 A1    12/2014   Han et al.
2018/0132264 A1*   5/2018    Jung ...................... H04L 1/1812
(Continued)

FOREIGN PATENT DOCUMENTS

JP    2013-520911 A    6/2013
JP    2015-109651 A    6/2015

OTHER PUBLICATIONS

International Search Report issued in PCT/JP2017/011892 dated Jun. 20, 2017 (2 pages).
(Continued)

*Primary Examiner* — Moo Jeong
(74) *Attorney, Agent, or Firm* — Osha Bergman Watanabe & Burton LLP

(57) ABSTRACT

According to one aspect of the present invention, a terminal has a receiving section that receives configuration information for multiplexing a short uplink control channel having a short time length and a long uplink control channel having a longer time length than the short uplink control channel within a predetermined period, and a control section that decides whether or not to multiplex the short uplink control channel and the long uplink control channel in the predetermined period based on the configuration information. According to one aspect of the present invention, uplink control information can be reported properly even when multiple uplink control channels of varying time lengths are used.

7 Claims, 12 Drawing Sheets

(51) Int. Cl.
*H04W 72/04* (2009.01)
*H04W 72/12* (2009.01)

(58) Field of Classification Search
CPC ........... H04W 72/048; H04W 72/0446; H04W 72/1268; H04W 72/1289
See application file for complete search history.

(56) References Cited

U.S. PATENT DOCUMENTS

| | | | |
|---|---|---|---|
| 2018/0227949 A1* | 8/2018 | Tiirola | H04W 74/04 |
| 2019/0174492 A1* | 6/2019 | Gao | H04B 7/0628 |
| 2019/0297626 A1 | 9/2019 | Kang et al. | |
| 2019/0357025 A1* | 11/2019 | Hwang | H04L 5/001 |

OTHER PUBLICATIONS

Written Opinion of the International Searching Authority issued in PCT/JP2017/011892 dated Jun. 20, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS36.300 version 8.12.0 Release 8)"; Apr. 2010; (153 pages).
3GPP TSG RAN WG1 meeting #88; R1-1701956 "On duration aspects of NR PUCCH with long duration" Guangdong OPPO Mobile Telecom; Athens, Greece; Feb. 13-17, 2017 (5 pages).
3GPP TSG RAN WG1 Meeting #87; R1-1611840 "Overall structure of UL control channel for NR" LG Electronics Reno, USA; Nov. 14-18, 2016 (6 pages).
3GPP TSG RAN WG1 Meeting #88; R1-1702479 "Design of short NR-PUCCH format" LG Electronics; Athens, Greece; Feb. 13-17, 2017 (7 pages).
3GPP TSG RAN WG1 Meeting #88; R1-1701647 "Long duration PUCCH design" Huawei, HiSilicon; Athens, Greece Feb. 13-17, 2017 (4 pages).
3GPP TSG RAN WG1 Meeting #86; R1-168514 "WF on PUCCH retuning for BL/CE UE" Ericsson, Samsung, NEC, Qualcomm, Virtuosys, Sony, Sierra Wireless, NTT DoCoMo, AT&T, Intel; Gothenburg, Sweden; Aug. 22-26, 2016 (4 pages).
Extended European Search Report issued in European Application No. 17902154.8, dated Oct. 13, 2020 (14 pages).
Office Action issued in the counterpart Korean Patent Application No. 10-2019-7029808, dated Mar. 23, 2021 (8 pages).
Office Action issued in the counterpart Japanese Patent Application No. 2019-506868, dated May 25, 2021 (9 pages).

* cited by examiner

USER TERMINAL AND RADIO COMMUNICATION METHOD

TECHNICAL FIELD

The present invention relates to a terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a terminal (UE (User Equipment)) transmits uplink control information (UCI) by using uplink control channels (for example, PUCCH (Physical Uplink Control CHannel)) and/or uplink data channels (for example, PUSCH (Physical Uplink Shared CHannel)). The format of these uplink controls channel is referred to as "PUCCH format" and so on.

UCI includes at least one of a scheduling request (SR), retransmission control information in response to DL data (DL data channel (PDSCH (Physical Downlink Shared CHannel))) (also referred to as "HARQ-ACK (Hybrid Automatic Repeat reQuest-ACKnowledgement)," "ACK," "NACK (Negative ACK)" and so on) and channel state information (CSI).

CITATION LIST

Non-Patent Literature

Non-Patent Literature 1: 3GPP TS36.300 V8.12.0"Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.).

For example, envisaging NR, research is underway to provide radio communication services referred to as "eMBB (enhanced Mobile Broad Band)," which supports high-speed, high-capacity communication, "mMTC (massive Machine-Type Communication)," which supports a large number of terminals, "URLLC (Ultra Reliable and Low Latency Communications)," which supports ultra-reliable and low-latency communication, and so on.

Now, to envisage NR, studies are in progress to use a number of PUCCHs having varying time lengths (for example, varying numbers of symbols). However, how to allow a single UE to multiplex these PUCCHs in 1 slot has not been studied so far. By introducing such a configuration, it is expected that the flexibility of scheduling in NR can be improved. In addition, if such a configuration cannot be used, there is a possibility that the throughput of communication, spectral efficiency and so on might deteriorate.

The present invention has been made in view of the above, and it is therefore an object of the present invention to provide a terminal and a radio communication method, whereby, uplink control information can be reported properly even when multiple uplink control channels of varying time lengths are used.

Solution to Problem

A terminal according to one example of the present invention has a receiving section that receives configuration information for multiplexing a short uplink control channel having a short time length and a long uplink control channel having a longer time length than the short uplink control channel within a predetermined period, and a control section that decides whether or not to multiplex the short uplink control channel and the long uplink control channel in the predetermined period based on the configuration information.

Advantageous Effects of Invention

According to the present invention, uplink control information can be reported properly even when multiple uplink control channels of varying time lengths are used.

DESCRIPTION OF EMBODIMENTS

Figure 1A:
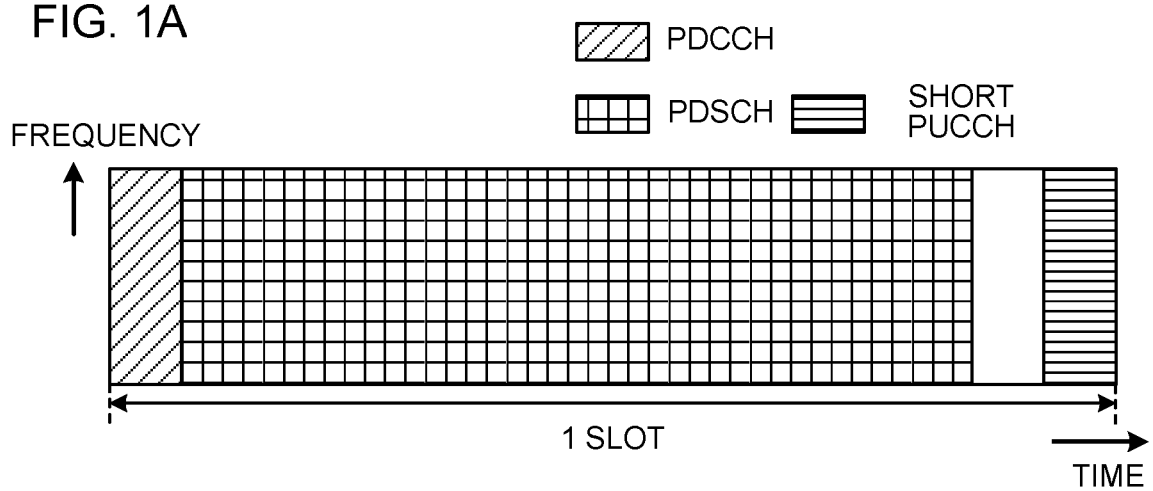
FIGS. 1A to 1C are diagrams to show examples of resource mapping in NR slots.

Envisaging future radio communication systems (for example, including LTE Rel. 14, 15 and later versions, 5G, NR, etc., hereinafter referred to as "NR"), studies are underway to introduce multiple numerologies, rather than a single numerology.

Here, a numerology may refer to a set of communication parameters that characterize the design of signals in a given RAT (Radio Access Technology), the design of a RAT and so on, and may include parameters that are defined with respect to the frequency direction and/or the time direction, such as subcarrier spacing (SCS), the length of symbols, the length of cyclic prefixes, the length of subframes, the length of transmission time intervals (TTIs) and so on. For example, NR might support multiple SCSs such as 15 kHz, 30 kHz, 60 kHz, 120 kHz and 240 kHz.

Also, NRs are being studied to introduce time units (also referred to as "subframes," "slots," "minislots," "subslots," "TTIs," "short TTIs," "radio frames" and so on) that are the same as and/or different from those of existing LTE systems (LTE Rel. 13 or earlier versions), while supporting multiple numerologies and/or the like.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, 14 symbols), the transport blocks, the code blocks and/or the codewords of transmitting/receiving data can be transmitted and received in 1 or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, 1 ms), irrespective of which numerology is used by (and/or configured in) the terminal (for example, UE (User Equipment)).

On the other hand, slots may serve as a time unit that is based on the numerology used by the UE. For example, if SCS is 15 kHz or 30 kHz, the number of symbols per slot may be 7 or 14. When the subcarrier spacing is 60 kHz or greater, the number of symbols per slot may be 14. In addition, a slot may include a plurality of minislots (sub slots).

Generally, SCS and symbol duration are reciprocal. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that, "SCS is high" may be paraphrased as "SCS is wide," and "SCS is low" may be paraphrased as "SCS is narrow."

For such future radio communication systems, a study is in progress to support a UL control channel (hereinafter also referred to as a "short PUCCH") that is structured to be shorter in duration than the PUCCH (Physical Uplink Control CHannel) formats of existing LTE systems (for example, LTE Rel. 8 to 13) and/or a UL control channel (hereinafter also referred to as a "long PUCCH") that is structured to have a longer duration than the above short duration.

A short PUCCH may be referred to as a "PUCCH in short duration," and a long PUCCH may be referred to as a "PUCCH in long duration." Alternatively, a short PUCCH may be referred to as "PUCCH format 1," "PUCCH configuration 1," "PUCCH mode 1" and so on, and a long PUCCH may be referred to as "PUCCH format 2," "PUCCH configuration 2," "PUCCH mode 2" and the like. Note that 1 and 2 may be reversed.

The short PUCCH is comprised of a predetermined number of symbols (for example, 1 or 2 symbols) in an SCS. In this short PUCCH, uplink control information (UCI) and a reference signal (RS) may be time-division-multiplexed (TDM) or frequency-division-multiplexed (FDM). The RS may be, for example, the demodulation reference signal (DMRS (DeModulation Reference Signal)) that is used to demodulate UCI.

The SCS in each symbol of the short PUCCH may be the same as or higher than the SCS in symbols for data channels (hereinafter also referred to as "data symbols"). The data channels may be, for example, a downlink data channel (PDSCH (Physical Downlink Shared CHannel)), an uplink data channel (PUSCH (Physical Uplink Shared CHannel)) and so on.

A short PUCCH may be referred to as a "PUCCH with a higher (bigger, wider, etc.) SCS" (for example, 60 kHz). Note that the time unit in which 1 short PUCCH is transmitted may be referred to as a "short TTI."

In a short PUCCH, a multicarrier waveform (for example, a waveform based on cyclic prefix OFDM (CP-OFDM (Cyclic Prefix Orthogonal Frequency Division Multiplexing))) may be used, or a single-carrier waveform (for example, a waveform based on DFT-S-OFDM (Discrete Fourier Transform Spread Orthogonal Frequency Division Multiplexing) may be used.

Note that the waveform may be referred to as "communication scheme," "multiplexing scheme," "modulation scheme," "access scheme," "waveform scheme," and so on. Also, these waveforms may be characterized based on whether or not DFT precoding (spreading) is applied to the OFDM waveform. For example, CP-OFDM may be referred to as "waveform (signal) to which DFT precoding is not applied," and DFT-S-OFDM may be referred to as "waveform (signal) to which DFT precoding is applied." Furthermore, a "waveform" may also be referred to as "waveform signal," "signal in accordance with waveform," "waveform of signal," "signal," and so on.

On the other hand, a long PUCCH is allocated across symbols in a slot so as to improve the coverage and/or to communicate more UCI than a short PUCCH.

Multiple prospective symbols which a long PUCCH supports may be defined or configured. For example, a long PUCCH may support multiple symbols—more specifically, a predetermined number of or more symbols (for example, 4 symbols). In this long PUCCH, UCI and an RS (for example, the DMRS) may be time-division-multiplexed (TDM) or frequency-division-multiplexed (FDM).

A long PUCCH may be referred to as a "PUCCH with a lower (smaller, narrower, etc.) SCS" (for example, 15 kHz). Note that the time unit in which 1 long PUCCH is transmitted may be referred to as a "long TTI."

Also, a long PUCCH may be comprised of a number of frequency resources to match a short PUCCH, or may be formed with a smaller number of frequency resources (for example, 1 or 2 physical resource blocks (PRBs)) than a short PUCCH, in order to achieve a power boosting effect. Also, a long PUCCH may be placed with a short PUCCH in the same slot.

For a long PUCCH, a single-carrier waveform (for example, DFT-s-OFDM waveform) may be used, or a multi-carrier waveform (for example, OFDM waveform) may be used. In addition, frequency hopping may be applied to a long PUCCH, per predetermined period within a slot (for example, per mini (sub) slot).

Note that a long PUCCH may be a PUCCH that is different from the PUCCHs stipulated in existing LTE systems (for example, LTE Rel. 8 to 13) (that is, a long PUCCH may be a PUCCH of a different format).

Hereinafter, a "PUCCH," when simply mentioned so, may be interpreted as meaning "a short PUCCH and/or a long PUCCH."

The PUCCH may be time-division-multiplexed (TDM) and/or frequency-division-multiplexed (FDM) with a UL data channel (hereinafter also referred to as "PUSCH") in the slot. Also, the PUCCH may be time-division-multiplexed (TDM) and/or frequency-division-multiplexed (FDM) with a DL data channel (hereinafter also referred to as "PDSCH") and/or a DL control channel (hereinafter also referred to as "PDCCH (Physical Downlink Control CHannel)") within the slot.

UCI to include at least one of retransmission control information (also referred to as "HARQ-ACK," "ACK/NACK," "A/N," etc.) in response to DL data, a scheduling request (SR), CSI (for example, periodic CSI (P-CSI), aperiodic CSI (A-CSI), etc.) beam identification information, a buffer status report (BSR), a power headroom report (PHR), and other types of control information, is transmitted using the PUCCH.

A beam may be specified by a beam index (BI), a PMI, a TPMI, a predetermined reference signal's port index (for example, a DMRS port index (DPI), an SRS port index (SPI), etc.), a predetermined reference signal's resource indicator (for example, CSI-RS resource indicator (CRI), DMRS resource index (DRI), SRS resource index (SRI), etc.) and so on.

Figure 1B:
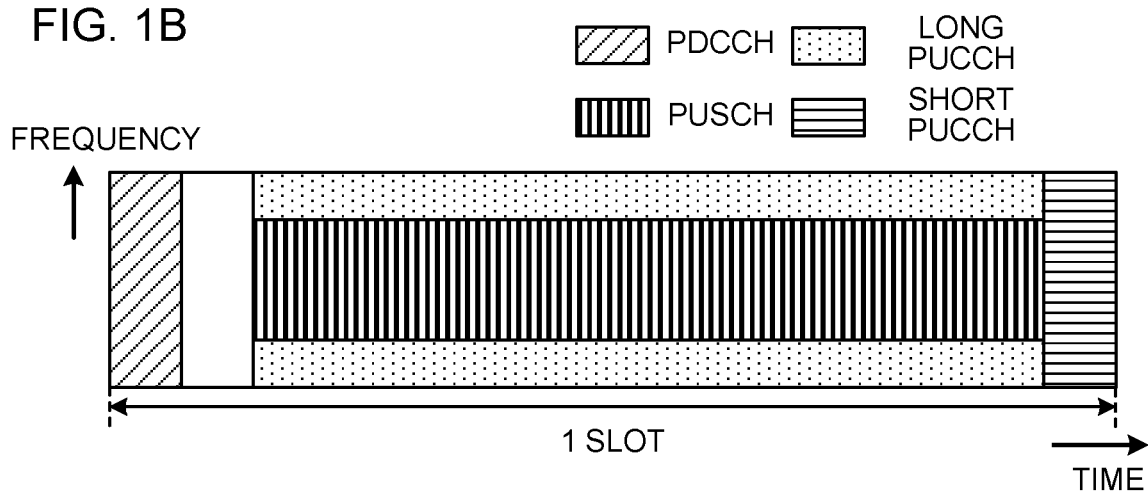
Figure 1C:
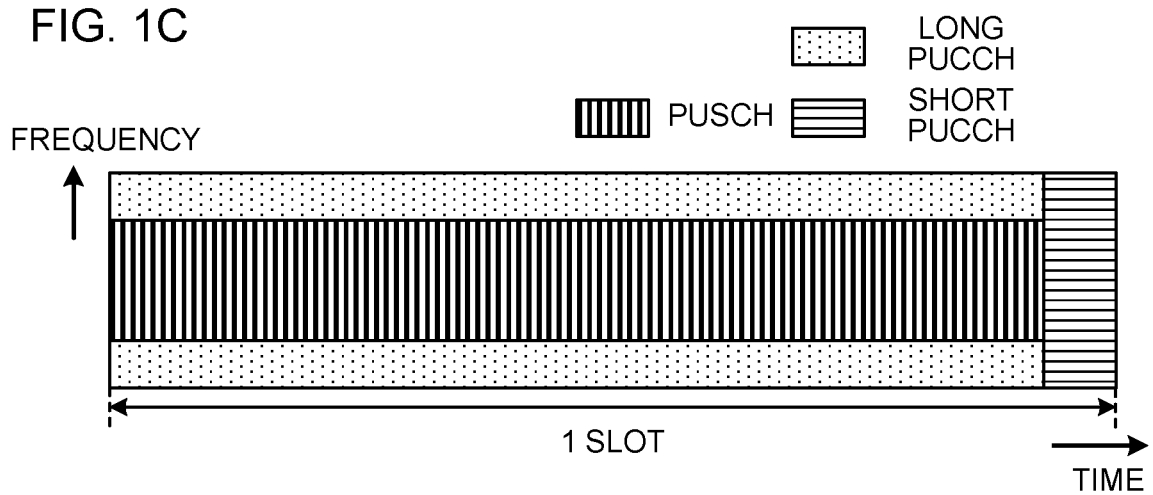

FIGS. 1A to 1C are diagrams to show examples of resource mapping in NR slots. Studies are in progress for NR, in which a period for transmitting data is defined as a UL period, and a period in which UL transmission can be performed using a small number of symbols is defined as a short UL period. Note that a UL period may be referred to as a "long UL period." Also, a "period" may be read as a "field," a "resource," a "symbol," or the like. Also, the configuration of NR slots (NR subframes) is not limited to the examples shown in FIGS. 1A to 1C. For example, the order of these fields is not limited to those shown in the drawings.

With reference to FIG. 1A, NR slots are formed by arranging a PDCCH field, a PDSCH field, a non-transmission period (also referred to as a "guard period (GP)"), and a short UL field including a short PUCCH, in order, from the beginning of a slot. In this way, a slot in which symbols for DL communication are included more than symbols for UL communication may be referred to as a "DL-centric slot."

With reference to FIG. 1B, NR slots are formed by arranging a PDCCH field, a guard period, a UL field including a long PUCCH and a PUSCH, and a short UL field including a short PUCCH, in order, from the beginning of each slot. In this way, a slot in which symbols for UL communication are included more than symbols for DL communication may be referred to as a "UL-centric slot."

With reference to FIG. 1C, NR slots are formed by arranging a UL field including a long PUCCH and a PUSCH, and a short UL field including a short PUCCH, in order, from the beginning of each slot. In this way, a slot in which symbols for DL communication are not included may be referred to as a "UL-only slot." Note that a UL-only slot may contain a guard period.

Now, envisaging NR, studies are underway to support time-division-multiplexing (TDM) and/or frequency-division-multiplexing (FDM) short PUCCHs and long PUCCHs for varying UEs within 1 slot.

Also, envisaging URLLC, a study is in progress to provide resources for SR transmission at shorter time intervals than 1 slot, in order to achieve low latency.

Figure 2A:
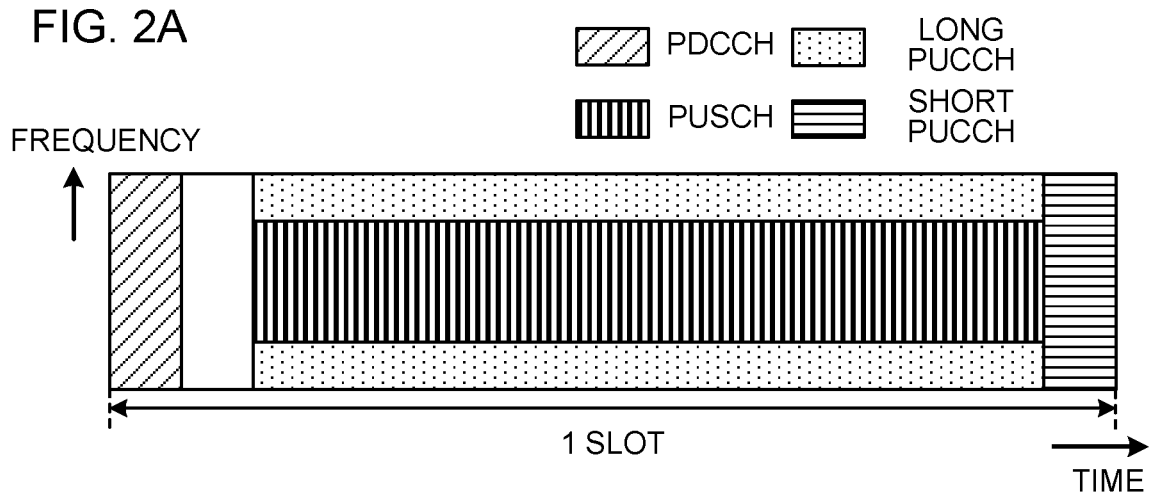
FIGS. 2A to 2C are diagrams to show examples of resource mapping in the event of time-division-multiplexing (TDM) and/or frequency-division-multiplexing (FDM) long PUCCHs and short PUCCHs for varying UEs.
Figure 2B:
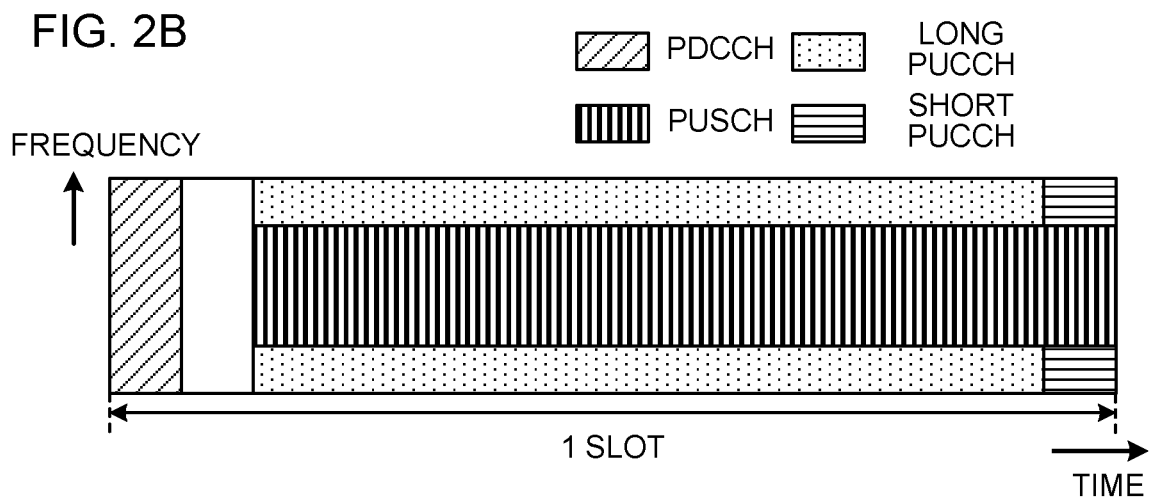
Figure 2C:
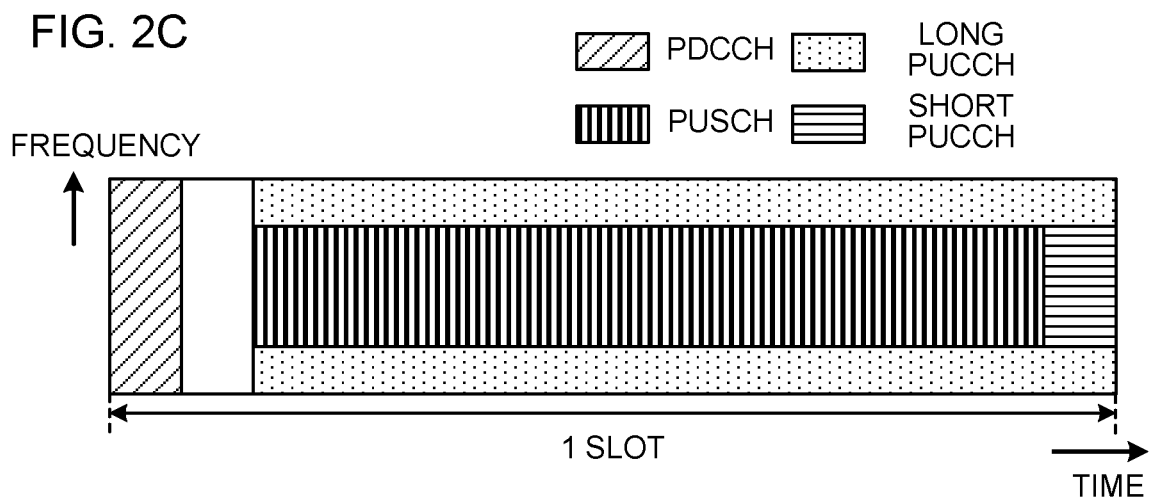

FIGS. 2A to 2C are diagrams to show examples of resource mapping in the event of time-division-multiplexing (TDM) and/or frequency-division-multiplexing (FDM) long PUCCHs and short PUCCHs for varying UEs. FIGS. 2A and 2C each show an example of a DL-centric slot.

In FIG. 2A, a short PUCCH is time-division-multiplexed (TDM) with a long PUCCH and a PUSCH. In FIG. 2B, a short PUCCH is time-division-multiplexed (TDM) with a long PUCCH, and time-division-multiplexed (TDM) and frequency-division-multiplexed (FDM) with a PUSCH. In FIG. 2C, a short PUCCH is time-division-multiplexed (TDM) and frequency-division-multiplexed (FDM) with a long PUCCH, and time-division-multiplexed (TDM) with a PUSCH.

However, how to multiplex a short PUCCH and a long PUCCH for a single UE (for the same UE) in 1 slot has not been studied so far. By introducing such a configuration, it is expected that the flexibility of scheduling in NR can be improved. In addition, if such a configuration cannot be used, there is a possibility that the throughput of communication, spectral efficiency and so on might deteriorate.

So, the present inventors have worked on a method of multiplexing a short PUCCH and a long PUCCH for the same UE in 1 slot, and arrived at the present invention. In addition, presuming the case where a short PUCCH and a long PUCCH for the same UE are multiplexed within 1 slot, the present inventors have found out a method for using both PUCCHs properly (including, for example, allocating signals properly).

Now, embodiments of the present invention will be described below in detail with reference to the accompanying drawings. Note that the radio communication methods according to each embodiment may be applied individually or may be applied in combination.

(Radio Communication Method)

First Embodiment

The first embodiment of the present invention relates to the case where UE is configured to multiplex a long PUCCH and a short PUCCH in the same slot.

The UE may transmit UCIs corresponding to varying UCI types, using the long PUCCH and the short PUCCH, in the same slot, or transmit UCIs corresponding to the same UCI type.

Here, the UCI types may contain information that shows the contents of UCI (showing which UCI will be sent). For example, a UCI type may be information to indicate that the UCI includes specific one or more of HARQ-ACK, SR, CSI, P-CSI, A-CSI, beam identification information, BSR, PHR, and other pieces of control information.

Also, a UCI type may contain information about the performance and/or quality required of the UCI. For example, a UCI type may indicate one of the delay (such as low latency), reliability (such as high reliability) and throughput (such as high throughput), or indicate a combination of these. Also, a UCI type may contain information about the NR service type, or contain, for example, information to indicate whether the UCI is designed for at least one of eMBB, URLLC and mMTC.

For example, the UE may transmit one or more P-CSIs, in the same slot, by using a long PUCCH, and or transmit one or more HARQ-ACKs using the short PUCCH. In this case, the CSIs, with relatively large payload, can be reported in the long PUCCH of large resource capacity, and the HARQ-ACKs, with relatively small payload, can be transmitted in the short PUCCH, so that it is possible to reserve a balance of quality between them.

Here, if an SR is present, the SR may be multiplexed with P-CSI of the long PUCCH, and may be multiplexed with HARQ-ACK in the short PUCCH. Note that different SRs that require different resources for different traffic may be transmitted using both the long PUCCH and the short PUCCH.

Also, the UE may transmit, in the same slot, HARQ-ACKs in response to specific types of DL data by using the long PUCCH, and transmit HARQ-ACKs in response to other types of DL data by using the short PUCCH. For example, the long PUCCH may be used for HARQ-ACKs in response to DL data of high reliability (for example, DL data for URLLC), and the short PUCCH may be used for HARQ-ACKs in response to DL data of low latency (for example, DL data for eMBB). In this case, the long PUCCH, which can ensure quality more easily, is used to transmit UCI that requires high reliability as feedback, and the short PUCCH is used to transmit UCI that requires low latency, so that the latency can be reduced.

Note that, when HARQ-ACKs are transmitted using both a long PUCCH and a short PUCCH, these HARQ-ACKs may be HARQ-ACKs pertaining to pieces of data that have been transmitted and received in different slots, minislots, component carriers and/or cells.

For example, when transmitting a long PUCCH and a short PUCCH in an n-th slot, HARQ-ACKs in response to data up to the (n−k−1)-th slot may be transmitted in the long PUCCH, and HARQ-ACKs in response to the (n−k)-th slot data may be transmitted in the short PUCCH. In this case, even if HARQ-ACKs in response to data of the (n−k)-th slot cannot be transmitted in the long PUCCH because there is no processing time left, the processing time until the start of transmission of the short PUCCH can be sufficiently reserved, so that it is possible to decode data, and generate HARQ-ACKs properly.

For example, when transmitting a long PUCCH and a short PUCCH in an m-th component carrier, HARQ-ACKs in response to data other than the m-th component carrier may be transmitted in the long PUCCH, and HARQ-ACKs in response to the data of the n-th component carrier may be transmitted in the short PUCCH. In this case, too, HARQ-ACKs in response to the data of the m-th component carrier and HARQ-ACKs in response to data of other component carriers can be generated at different processing times, so that HARQ-ACKs can be generated with less latency, in a specific component carrier.

Here, if an SR is present, this SR may be multiplexed with the HARQ-ACKs of the long PUCCH, or may be multiplexed with the HARQ-ACKs of the short PUCCH. Note that different SRs that require different resources for different traffic may be transmitted using both the long PUCCH and the short PUCCH.

The UE may select the UCI to transmit in the long PUCCH and/or the short PUCCH based on information as to which UCI types can be transmitted in the long PUCCH and/or the short PUCCH.

Information about the UCI types that can be transmitted in the long PUCCH and/or the short PUCCH may be reported (configured) from a base station (which may be referred to as a "BS (Base Station)," a "transmission/reception point (TRP)," an "eNB (eNode B)," a "gNB," etc.) to UE by using higher layer signaling (for example, RRC (Radio Resource Control) signaling, MAC (Medium Access Control) signaling (for example, MAC control elements (MAC CEs), broadcast information, etc.), physical layer signaling (for example, downlink control information (DCI)), or a combination of these.

The UE may identify resources (configured) for transmitting the long PUCCH and/or the short PUCCH based on information related to the time and/or frequency resources for the long PUCCH and/or the short PUCCH.

Information about the time and/or frequency resources for the long PUCCH and/or the short PUCCH may be reported (configured) from the base station to the UE by using higher layer signaling (for example, RRC signaling, broadcast information, etc.), physical layer signaling (for example, DCI) or a combination of these.

Note that information about the time and/or frequency resources for the long PUCCH and/or the short PUCCH may be at least one of for example, the timing of transmission (slot index, etc.), the cycle of transmission, the number of symbols, the duration of symbols, the number of resource blocks, information related to hopping (for example, information as to whether hopping is applied or not, indices to specify hopping patterns, etc.) and so forth.

Also, a long PUCCH and a short PUCCH may be time-division-multiplexed (TDM) or frequency-division-multiplexed (FDM), or may be time-division-multiplexed (TDM) and frequency-division-multiplexed (FDM).

The method of multiplexing a long PUCCH and a short PUCCH in the same slot (for example, TDM and/or FDM) may be configured in UE. Information regarding this multiplexing method may be reported (configured) by using higher layer signaling (for example, RRC signaling, broadcast information, etc.), physical layer signaling (for example, DCI) or a combination of these.

[TDM of long PUCCH and short PUCCH]

When a long PUCCH and a short PUCCH are time-division-multiplexed (TDM) (or configured for TDM), UE transmits one of the long PUCCH and the short PUCCH at a predetermined time based on scheduling by the base station (for example, based on timing indications with the above-described information related to time and/or frequency resources). By this means, the power of the PUCCH can be increased, so that the coverage can be reserved more easily. The base station preferably controls the time and frequency resources for the long PUCCH and for the short PUCCH not to overlap each other.

Figure 3A:
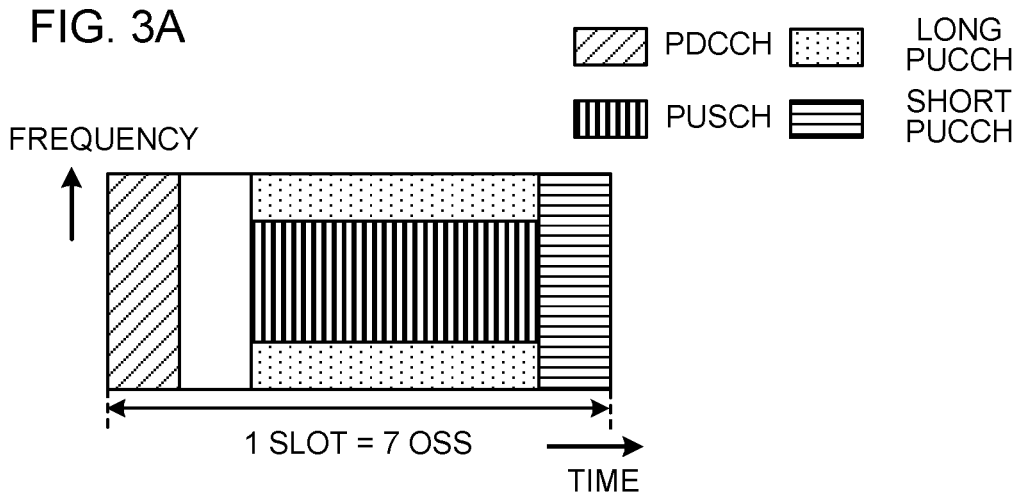
FIGS. 3A to 3C are diagrams to show examples of resource mapping in the event of time-division-multiplexing (TDM) long PUCCHs and short PUCCHs.
Figure 3B:
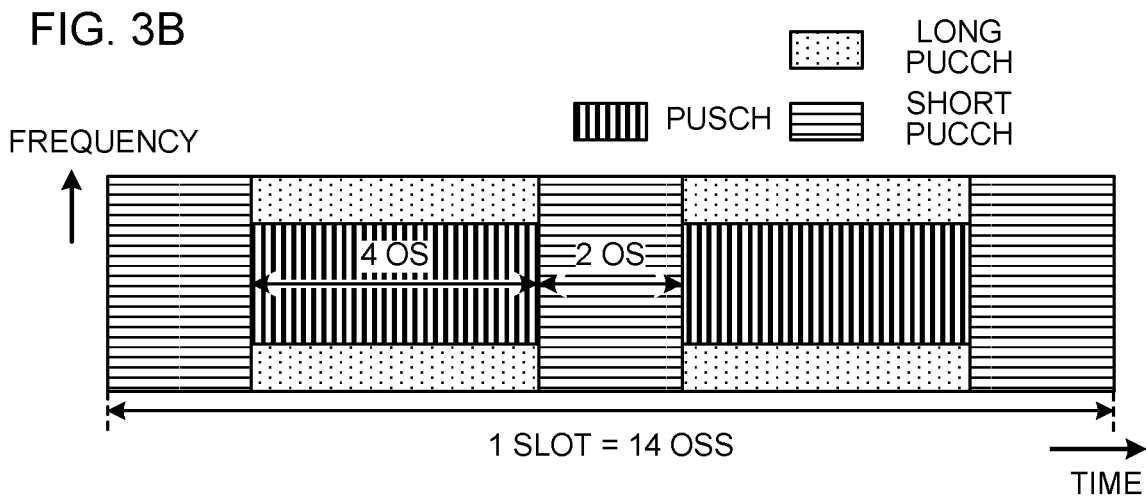
Figure 3C:
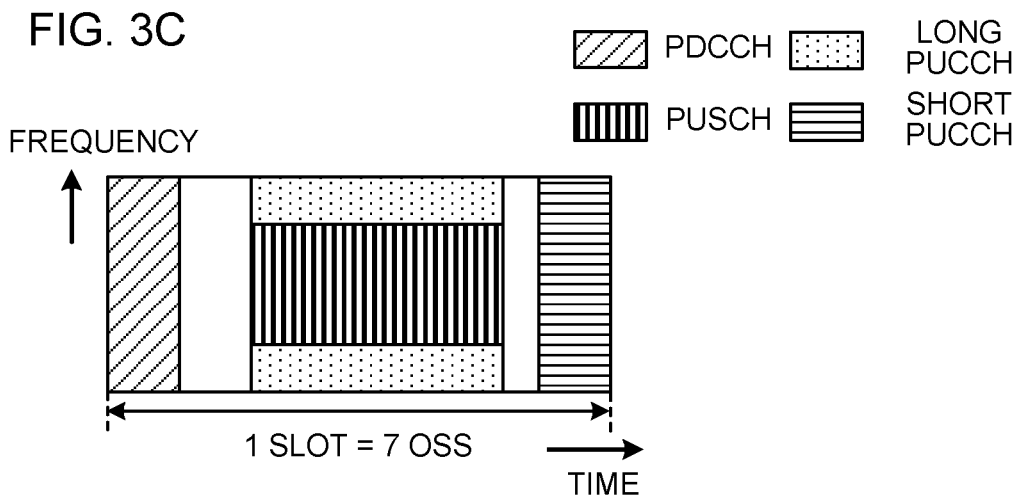

FIGS. 3A to 3C are diagrams to show examples of resource mapping in the event of time-division-multiplexing (TDM) long PUCCHs and short PUCCHs. FIGS. 3A and 3C each show an example of a DL-centric slot, where 1 slot is comprised of 7 OSs (OFDM symbols), and FIG. 3B shows an example of a UL-only slot, where 1 slot is comprised of 14 OSs. Note that the number of OSs that form a slot is not limited to these.

In FIG. 3A to 3C, a short PUCCH is time-division-multiplexed (TDM) with a long PUCCH and a PUSCH. In FIG. 3B, time-division-multiplexing (TDM) is executed so that 2 OSs-long short PUCCHs are located at the beginning, middle and end of a slot, and 4 OSs-long long PUCCHs and PUSCHs are located between them. In this way, a short PUCCH, a long PUCCH, a PUSCH and so forth may be transmitted in multiple non-contiguous fields, within 1 slot.

FIGS. 3A and 3B may be used when little (short) transient time is provided. Here, transient time may be referred to as "transient period," "waveform undefined interval," etc., and this is the time for switching from the power required during the off-state to the power required during the on-state (or the reverse).

During transient time, the quality of transmission signals is not guaranteed. For this reason, during transient time, the UE may transmit wrong signals (that do not fulfill predetermined quality), and/or the UE may be allowed not to transmit signals, and so on. That is, distortion of waveform is allowed during transient time. One or more periods may be defined as transient time, and, for example, a predetermined period (for example, 20 μs, 5 μs, etc.) may be defined.

When a short PUCCH is used, transient time is produced within a slot, and therefore interference or the like is produced between the short PUCCH and other signals (or channels), and the quality of communication might deteriorate. Therefore, when the transient time used is large (or long), it is preferable, as shown in FIG. 3C, to provide a gap period before (and/or after) the short PUCCH, so as to reduce the impact of the large transient time.

Figure 4A:
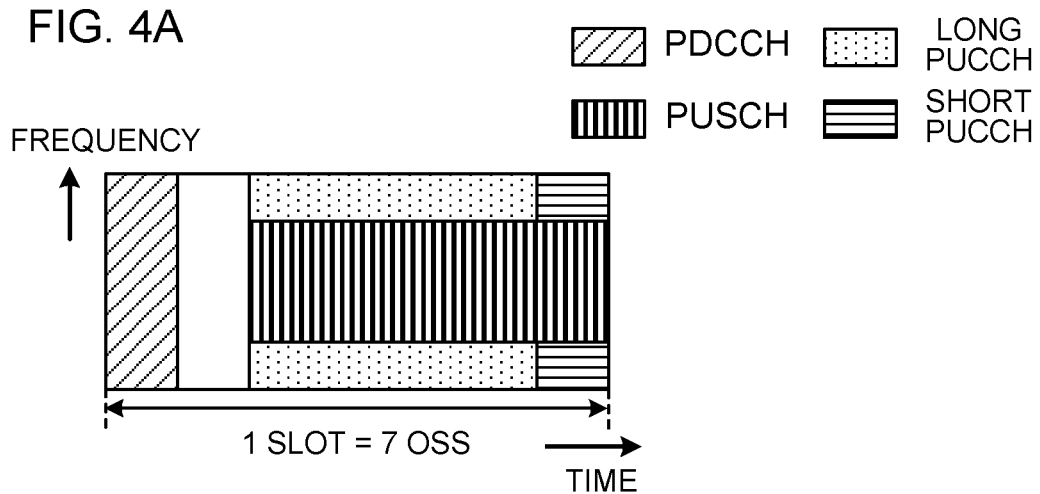
FIGS. 4A to 4C are diagrams to show other examples of resource mapping in the event of time-division-multiplexing (TDM) long PUCCHs and short PUCCHs.
Figure 4B:
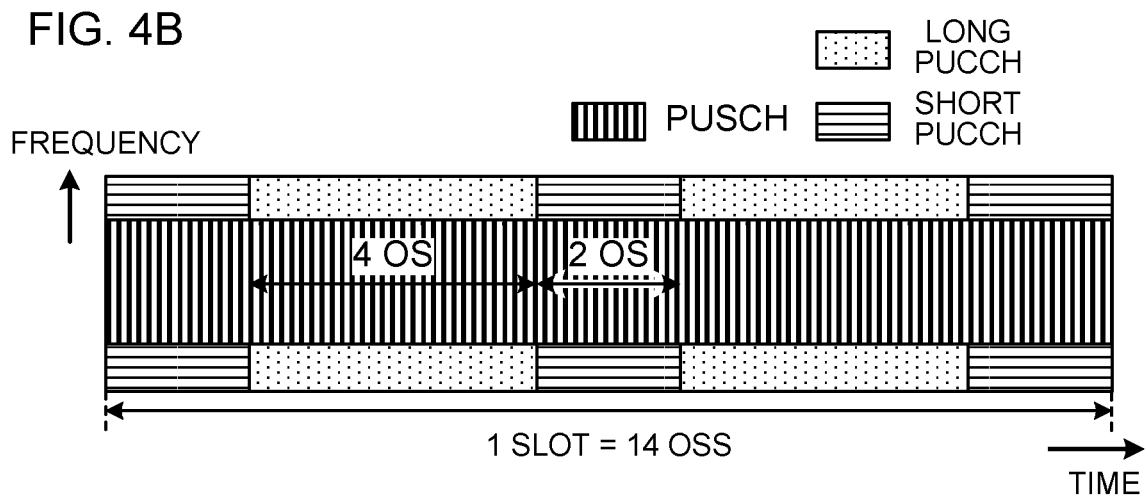
Figure 4C:
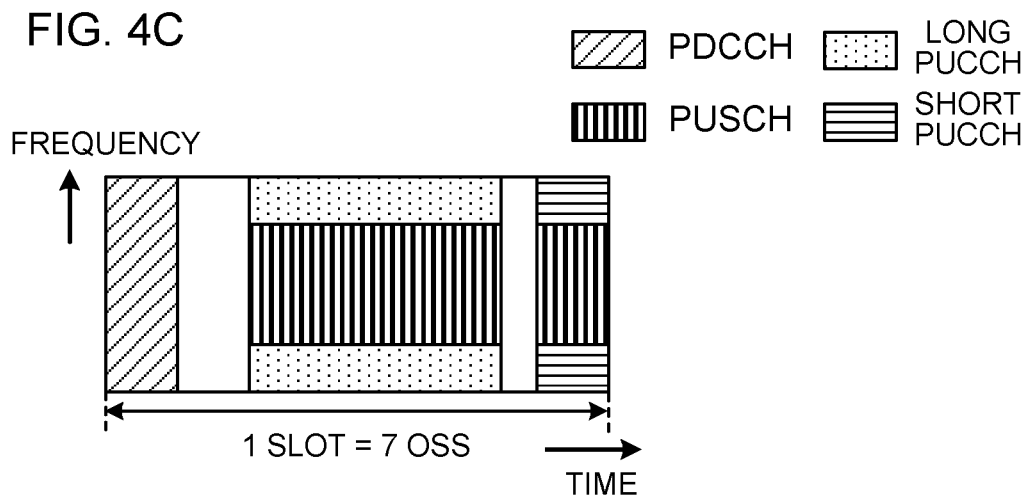

FIGS. 4A to 4C are diagrams to show other examples of resource mapping in the event of time-division-multiplexing (TDM) long PUCCHs and short PUCCHs. FIGS. 4A to 4C each show examples, in which the frequency resources for the short PUCCHs in FIGS. 3A to 3C are the same as the frequency resources (bandwidths) for the long PUCCHs. In FIGS. 4A to 4C, a short PUCCH is time-division-multiplexed (TDM) with a long PUCCH, and time-division-multiplexed (TDM) and frequency-division-multiplexed (FDM) with a PUSCH.

Cases occur where, in the same slot, resource for a long PUCCH (for example, time and/or frequency resources) and resource for a short PUCCH overlap each other (configured to overlap each other). For example, these resources may overlap each other in time, or may overlap each other in frequency. The control in this case will be described with reference to FIG. 5.

Figure 5A:
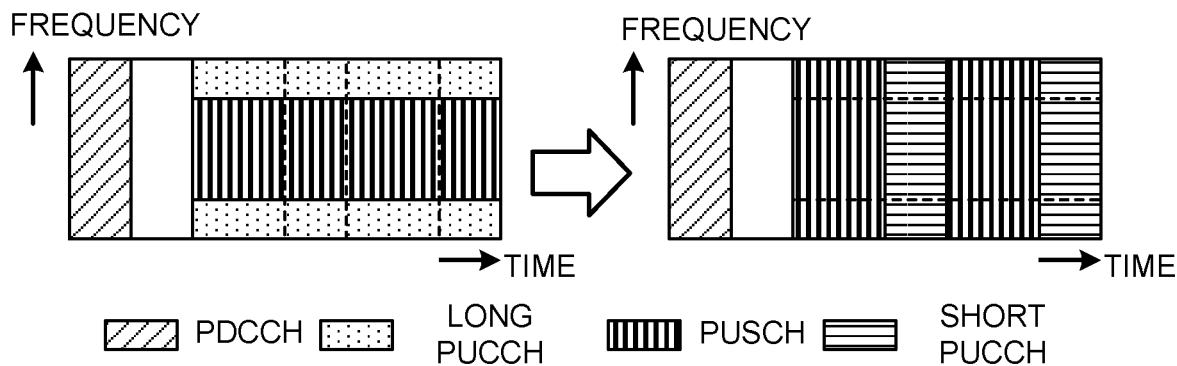
FIGS. 5A to 5C are diagrams to show examples of resource mapping in the event the timing for transmitting a long PUCCH and the timing for transmitting a short PUCCH overlap in time in the same slot.
Figure 5B:
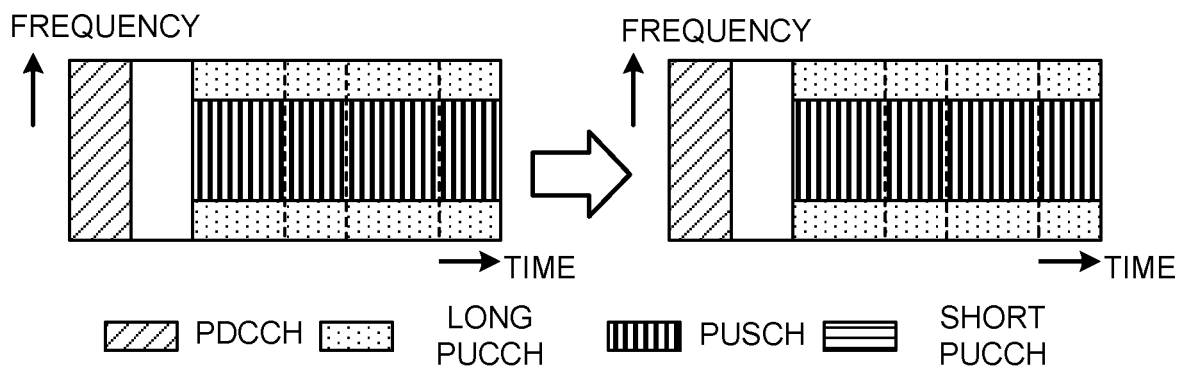
Figure 5C:
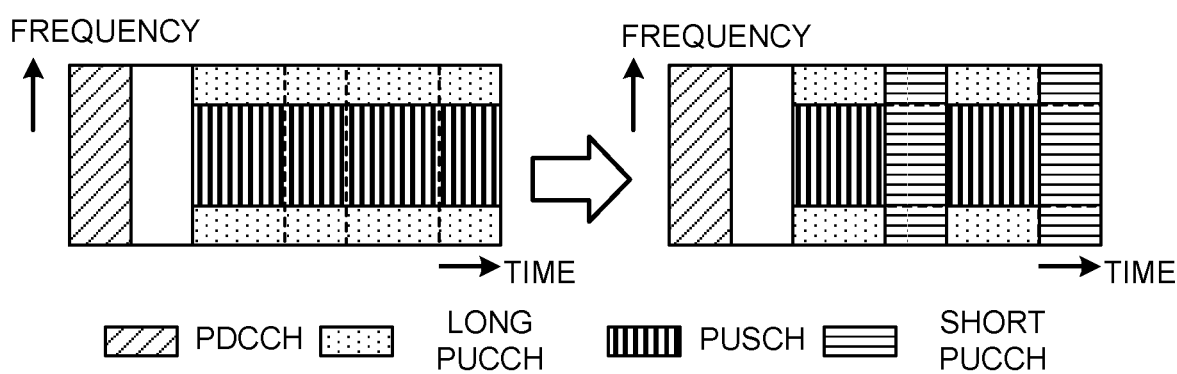

FIGS. 5A to 5C are diagrams to show examples of resource mapping in the event the timing for transmitting a long PUCCH and the timing for transmitting a short PUCCH overlap in time in the same slot. The left parts in FIGS. 5A to 5C show short PUCCH resources with dashed lines.

When the timing for transmitting a long PUCCH and the timing for transmitting a short PUCCH overlap in time in the same slot, the UE may implement at least 1 control of the following (1) to (3):

(1) Dropping the long PUCCH (FIG. 5A);
(2) Dropping the short PUCCH (FIG. 5B); and
(3) Puncturing the long PUCCH in the overlapping symbol (FIG. 5C). The right parts of FIGS. 5A to 5C show dropped or punctured resources with dashed lines.

In the case of (1) above, HARQ-ACKs and/or SRs that were going to be communicated in the long PUCCH may be communicated in (or piggyback on) the short PUCCH. Some or all of UCIs (for example, CSI) that were going to be communicated in the long PUCCH and that correspond to other UCI types (other than HARQ-ACKs and SRs) may be communicated in the short PUCCH, or predetermined information may be dropped based on predetermined priorities.

In the case of (2) above, HARQ-ACKs and/or SRs that were going to be communicated in the short PUCCH may be communicated in (or piggyback on) the long PUCCH. Some or all of UCIs (for example, CSI) that were going to be communicated in the short PUCCH and that correspond to other UCI types (other than HARQ-ACKs and SRs) may be communicated in the long PUCCH, or predetermined information may be dropped based on predetermined priorities.

Note that information about the predetermined priorities, information about the predetermined information to be dropped and so forth may be reported to the UE by higher layer signaling or the like, or may be specified in advance in the specification.

In the case of (3) above, UCI that was going to be communicated in the punctured resource of the long PUCCH may or may not be communicated in the short PUCCH. Also, information about the punctured resources (symbols) for the long PUCCH may be communicated in the short PUCCH.

[TDM and FDM of long PUCCH and short PUCCH]

When a long PUCCH and a short PUCCH are time-division-multiplexed (TDM), UE transmits one or both of the long PUCCH and the short PUCCH at a predetermined time, based on scheduling by the base station. The base station preferably controls the time and frequency resources for the long PUCCH and for the short PUCCH not to overlap each other.

Figure 6A:
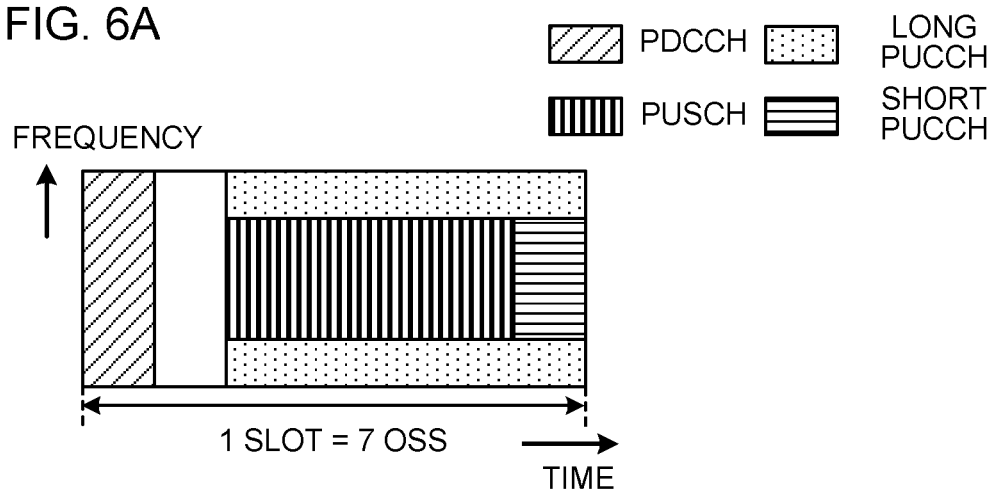
FIGS. 6A and 6B are diagrams to show examples of resource mapping in the event of time-division-multiplexing (TDM) and frequency-division-multiplexing (FDM) long PUCCHs and short PUCCHs.
Figure 6B:
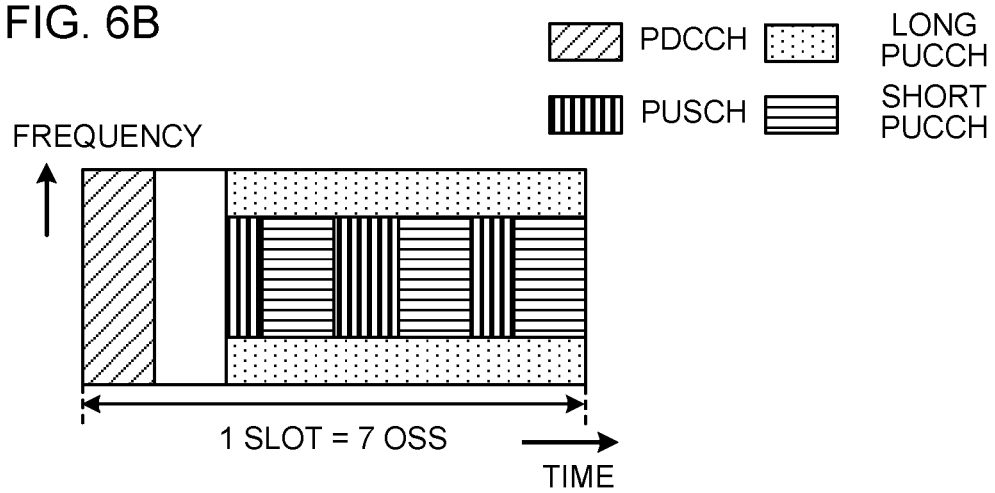

FIGS. 6A and 6B are diagrams to show examples of resource mapping in the event of time-division-multiplexing (TDM) and frequency-division-multiplexing (FDM) long PUCCHs and short PUCCHs. FIGS. 6A and 6B each show an example of a DL-centric slot. In FIGS. 6A and 6B, a short PUCCH is time-division-multiplexed (TDM) and frequency-division-multiplexed (FDM) with a long PUCCH, and time-division-multiplexed (TDM) with a PUSCH. As shown in FIG. 6B, a short PUCCH, a PUSCH and so forth may be transmitted in multiple non-contiguous fields, within 1 slot.

When resources (for example, time and/or frequency resources) for a long PUCCH and a short PUCCH overlap, the UE may implement at least one of following (1) to (4):

(1) Dropping the long PUCCH;
(2) Dropping the short PUCCH;
(3) Puncturing the long PUCCH in the overlapping symbol; and
(4) Puncturing the short PUCCH in the overlapping symbol.

UCI that is transmitted in the PUCCH that is dropped and/or punctured may be transmitted in the PUCCH that is not dropped and/or punctured, as described in the TDM-based example above.

As described above, according to the first embodiment, even when a long PUCCH and a short PUCCH are configured to be multiplexed in the same slot, UE can transmit the PUCCHs properly.

Second Embodiment

A second embodiment of the present invention relates to the case where UE is not configured to multiplex a long PUCCH and a short PUCCH in the same slot.

According to the second embodiment, UE transmits one of a long PUCCH and a short PUCCH in 1 slot based on scheduling by the base station (for example, based on timing indications with the above-described information related to time and/or frequency resources).

When the timing for transmitting a long PUCCH and the timing for transmitting a short PUCCH overlap in the same slot (or are configured to overlap in time), the UE may drop the long PUCCH, or drop the short PUCCH.

In the former case, HARQ-ACKs and/or SRs that were going to be communicated in the long PUCCH may be communicated in the short PUCCH. In the latter case, HARQ-ACKs and/or SRs that were going to be communicated in the short PUCCH may be communicated in the long PUCCH. Note that, UCIs (for example, CSI) that correspond to other UCI types (other than HARQ-ACKs and SRs) may be communicated or dropped in the PUCCH that is not dropped.

As described above, according to the second embodiment, even when a long PUCCH and a short PUCCH are not configured to be multiplexed in the same slot, UE can transmit the PUCCHs properly.

Third Embodiment

A third embodiment of the present invention relates to a method of appropriately determining whether to activate or deactivate multiplexing of a long PUCCH and a short PUCCH in the same slot, as described earlier with the first and second embodiments.

UE may transmit capability information as to whether or not the UE is capable of multiplexing a long PUCCH and a short PUCCH in the same slot, to the base station.

For example, the UE may transmit, for this capability information, information that indicates at least one of:
(1) The UE supports TDM of a long PUCCH and a short PUCCH in the same slot;
(2) The UE supports FDM of a long PUCCH and a short PUCCH in the same slot;
(3) The UE supports TDM and FDM of a long PUCCH and a short PUCCH in the same slot; and
(4) The UE does not support TDM of a long PUCCH and a short PUCCH in the same slot.

Note that this capability information may be common to or separate from the capability information about whether the UE is capable of multiplexing the NR PUCCH and the NR PUSCH. In the event these pieces of capability information are common, the capability information regarding multiplexing of a PUCCH and a PUSCH may be regarded (interpreted) as the capability information regarding multiplexing of a long PUCCH and a short PUCCH in the same slot. In the event these pieces of capability information are common, transmitting the capability information regarding multiplexing of a PUCCH and a PUSCH would be equal in effect to transmitting the capability information regarding multiplexing of a long PUCCH and a short PUCCH in the same slot.

Here, the capability information about multiplexing of a PUCCH and a PUSCH may be, for example, capability information about TDM and/or FDM of a short PUCCH and a PUSCH, or may be capability information about TDM and/or FDM of a long PUCCH and a PUSCH.

The base station configures the method of multiplexing (for example, TDM and/or FDM) a long PUCCH and a short PUCCH in the same slot, in the UE, based on at least one of the above-mentioned capability information reported from the UE. Information about the multiplexing method (may be referred to as "configuration information") may be reported (configured) by using higher layer signaling (for example, RRC signaling, broadcast information, etc.), physical layer signaling (for example, DCI) or a combination of these.

The UE may decide whether or not to multiplex the short PUCCH and the long PUCCH in 1 slot, based on this configuration information. Depending on this decision, the UE can determine whether to perform the process of the first embodiment or the process of the second embodiment.

As described above, according to the third embodiment, UE can decided, appropriately, whether or not a long PUCCH and a short PUCCH can be multiplexed in the same slot.

(Radio Communication System)

Now, the structure of the radio communication system according to one embodiment of the present invention will be described below. In this radio communication system, communication is performed using 1 or a combination of the radio communication methods according to the herein-contained embodiments of the present invention.

Figure 7:
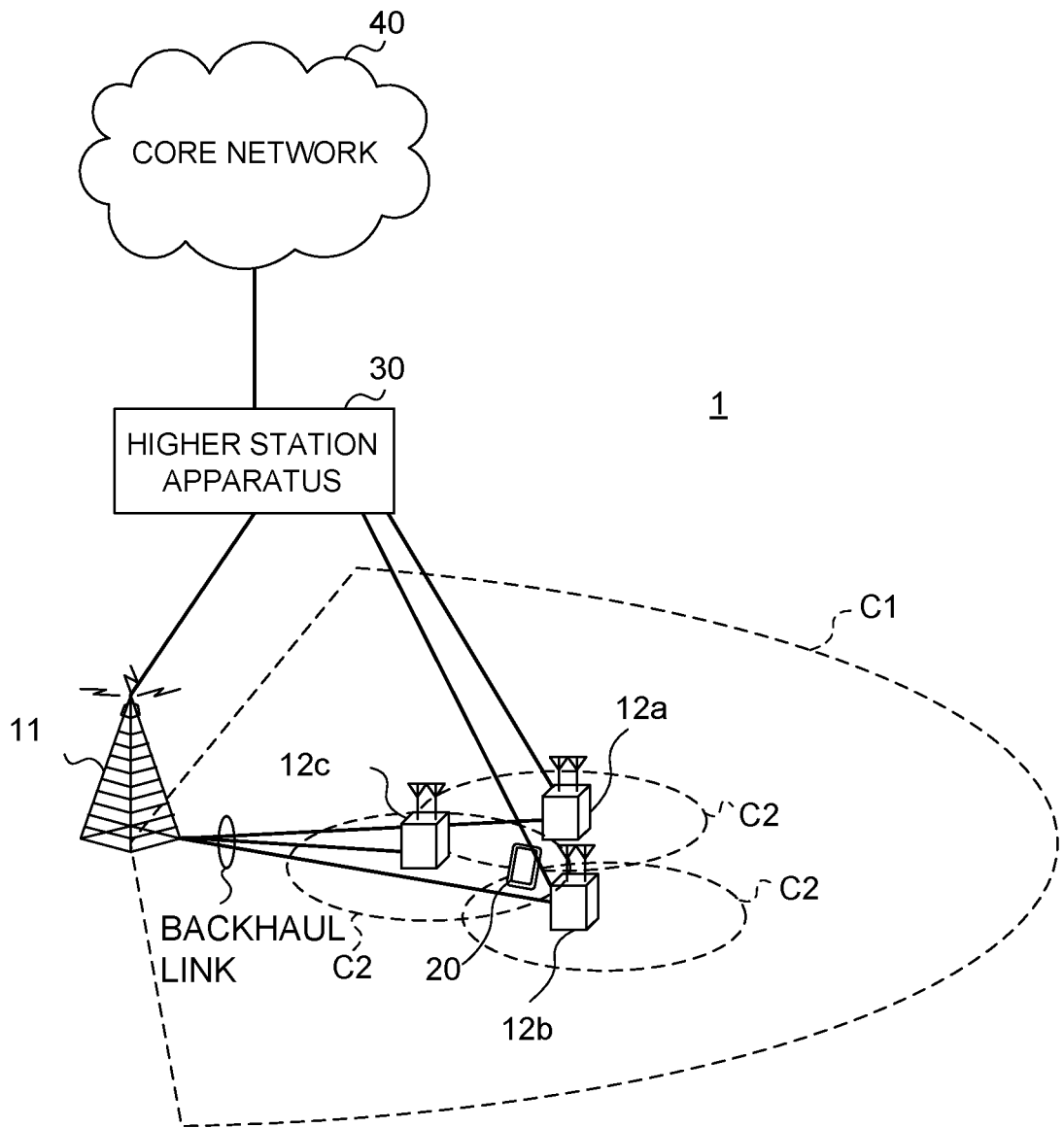
FIG. 7 is a diagram to show an exemplary schematic structure of a radio communication system according to one embodiment of the present invention.

FIG. 7 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into 1, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (fourth generation mobile communication system)," "5G (5th generation mobile communication system)," "FRA (Future Radio Access)," "New-RAT (Radio Access Technology)," and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, terminals 20 are placed in the macro cell C1 and in each small cell C2. The arrangement, number and so on of cells and terminals are not limited to those illustrated in the drawings.

The terminals 20 can connect with both the radio base station 11 and the radio base stations 12. The terminals 20 may use the macro cell C1 and the small cells C2 at the same time by means of CA or DC. Furthermore, the terminals 20 may apply CA or DC using a number of cells (CCs) (for example, 5 or fewer CCs or 6 or more CCs).

Between the terminals 20 and the radio base station 11, communication can be carried out using a carrier of a relatively low frequency bandwidth (for example, 2 GHz)

and a narrow bandwidth (referred to as, for example, an "existing carrier," a "legacy carrier" and so on). Meanwhile, between the terminals 20 and the radio base stations 12, a carrier of a relatively high frequency bandwidth (for example, 3.5 GHz, 5 GHz and so on) and a wide bandwidth may be used, or the same carrier as that used in the radio base station 11 may be used. Note that the structure of the frequency bandwidth for use in each radio base station is by no means limited to these.

Furthermore, the terminals 20 can communicate by using time division duplexing (TDD) and/or frequency division duplexing (FDD) in each cell. Furthermore, in each cell (carrier), a single numerology may be used, or a plurality of different numerologies may be used.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with 1 or contiguous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH (Physical Downlink Shared CHannel)), which is used by each terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, downlink control information (DCI) and so on, is communicated by the PDCCH.

Note that scheduling information may be reported via DCI. For example, the DCI for scheduling DL data reception may be referred to as "DL Assignment," and the DCI to schedule UL data transmission may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication systems 1, the cell-specific reference signal (CRS (Cell-specific Reference Signal)), the channel state information reference signal (CSI-RS (Channel State Information-Reference Signal)), the demodulation reference signal (DMRS (DeModulation Reference Signal)), the positioning reference signal (PRS (Positioning Reference Signal)) and so on are communicated as downlink reference signals. Also, in the radio communication system 1, the measurement reference signal (SRS (Sounding Reference Signal)), the demodulation reference signal (DMRS) and so on are communicated as uplink reference signals. Note that the DMRS may be referred to as a "terminal-specific reference signal (UE-specific Reference Signal)." Also, the reference signals to be communicated are by no means limited to these.

(Radio Base Station)

Figure 8:
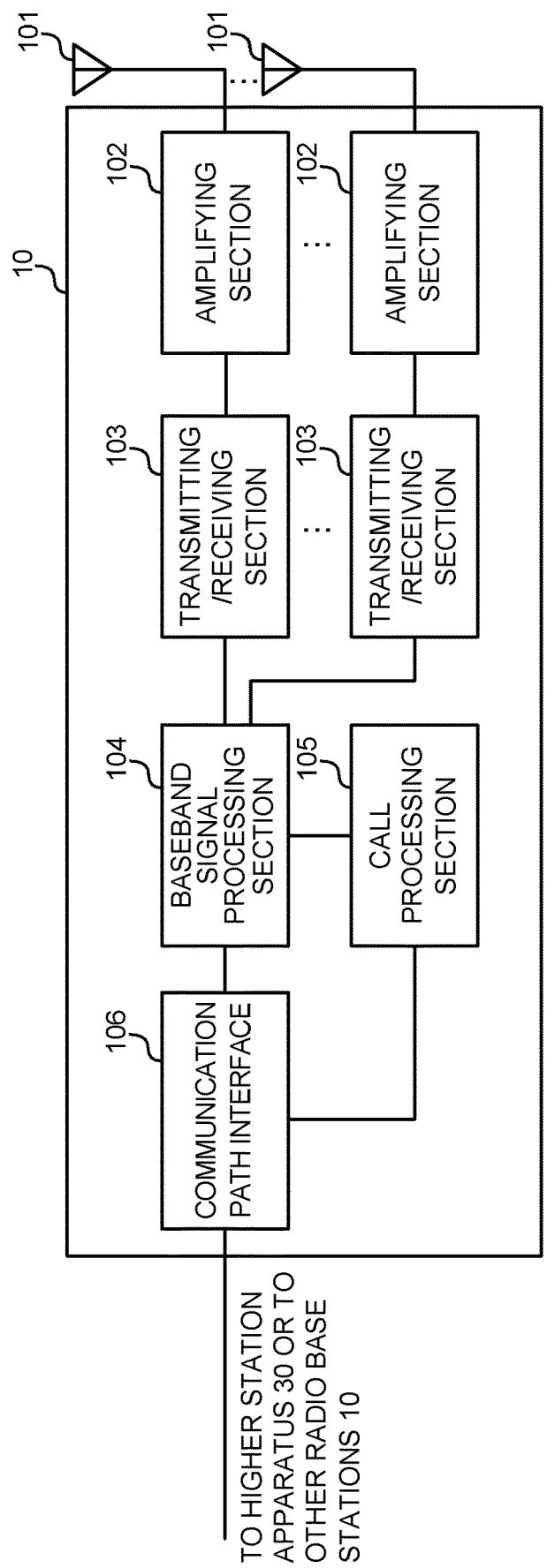
FIG. 8 is a diagram to show an exemplary overall structure of a radio base station according to one embodiment of the present invention.

FIG. 8 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit and/or receive signals using multiple TTIs of different lengths (TTI durations). For example, in one or more carriers (cells, CCs, etc.), the transmitting/receiving sections 103 may receive signals using a first TTI (for example, a long TTI) and a second TTI (for example, a short TTI) with a shorter TTI duration than the first TTI.

For example, the transmitting/receiving sections 103 may receive, from the terminal 20, a short PUCCH and a long PUCCH that are multiplexed (for example, TDM and/or FDM) and transmitted in a predetermined period (for example, 1 slot).

Also, the transmitting/receiving sections 103 may transmit, to the terminal 20, at least one of information (configuration information) about the types of UCI that can be transmitted in the long PUCCH and/or the short PUCCH, information about the time and/or frequency resources for the long PUCCH and/or the short PUCCH, and information about the method of multiplexing the long PUCCH and the short PUCCH in the same slot.

The transmitting/receiving sections 103 may receive, from the terminal 20, capability information about the capability for multiplexing the short PUCCH and the long PUCCH in the above predetermined period.

Figure 9:
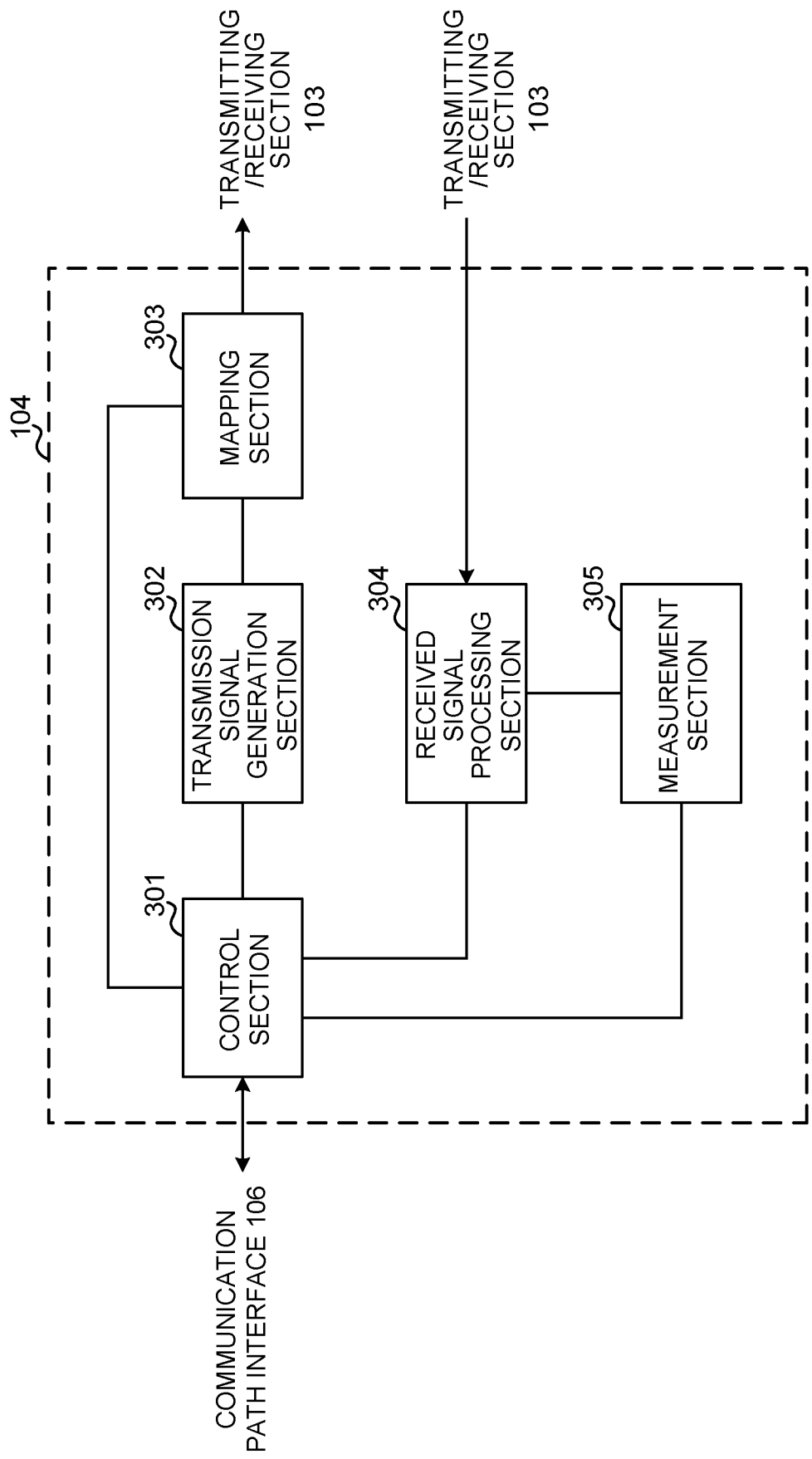
FIG. 9 is a diagram to show an exemplary functional structure of a radio base station according to one embodiment of the present invention.

FIG. 9 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 may control the scheduling of uplink data signals (for example, signals transmitted in the PUSCH), uplink control signals (for example, signals transmitted in the PUCCH and/or the PUSCH, such as acknowledgment information), random access preambles (for example, signal transmitted by the PRACH), uplink reference signals and so on.

The control section 301 controls the transmission and/or reception of signals in one or more CCs by using a first TTI (for example, a long TTI, a subframe, a slot, etc.) and a second TTI (for example, a short TTI, an sTTI, a minislot, etc.) with a shorter TTI duration than the first TTI.

For example, the control section 301 may decide (control), for a predetermined terminal 20, whether or not to multiplex a short uplink control channel (short PUCCH) having a short time length and a long uplink control channel (long PUCCH) having a longer time length than the short uplink control channel, within a predetermined period. The control section 301 may exert control so that information (configuration information) about the method of multiplexing the long PUCCH and the short PUCCH in the same slot is transmitted to a predetermined terminal 20.

The control section 301 may make this decision based on the predetermined terminal 20's capability information, acquired from the received signal processing section 304. This capability information may be information about the capability for multiplexing a short PUCCH and a long PUCCH in the above predetermined period.

Also, the predetermined period may be one or more TTIs, and may be, for example, one or more slots, one or more minislots, and/or the like.

The control section 301 may exert control so that PUCCH resources for the short PUCCH and/or the long PUCCH are selected for the predetermined terminal 20, and information for configuring these PUCCH resources is transmitted to the terminal 20.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI), and so on. The measurement results may be output to the control section 301.

(Terminal)

Figure 10:
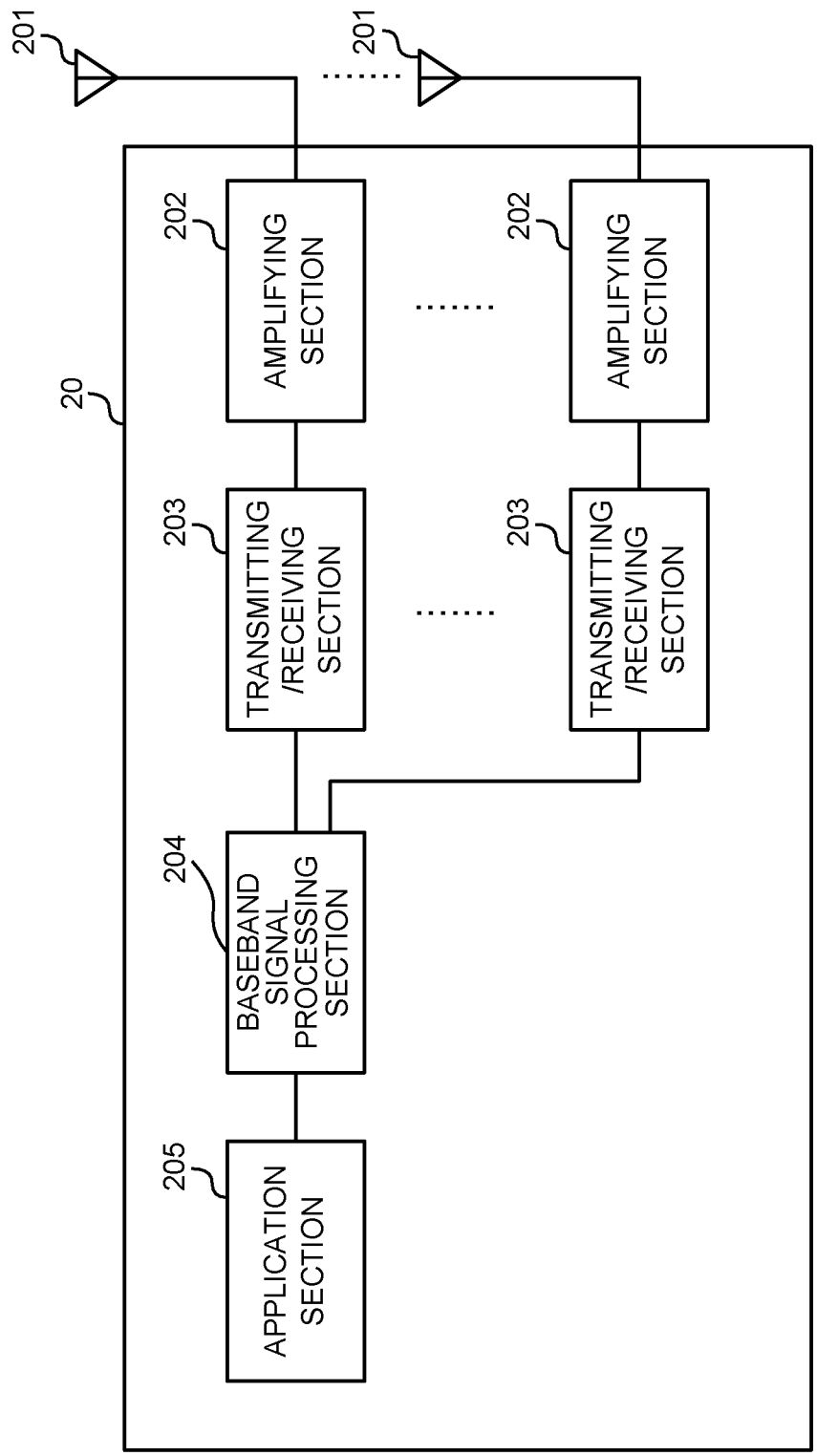
FIG. 10 is a diagram to show an exemplary overall structure of a terminal according to one embodiment of the present invention.

FIG. 10 is a diagram to show an example of an overall structure of a terminal according to one embodiment of the present invention. A terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 may transmit and/or receive signals using multiple TTIs of different lengths (TTI durations). For example, in one or more carriers (cells, CCs, etc.), the transmitting/receiving sections 203 may transmit signals using a first TTI (for example, a long TTI) and a second TTI (for example, a short TTI) with a shorter TTI duration than the first TTI.

For example, the transmitting/receiving sections 203 may multiplex and transmit a short PUCCH and a long PUCCH (for example, TDM and/or FDM) to the radio base station 10, in a predetermined period (for example, 1 slot).

Also, the transmitting/receiving sections 203 may receive, from the radio base station 10, at least one of information about the types of UCI that can be transmitted in the long PUCCH and/or the short PUCCH, information about the time and/or frequency resources for the long PUCCH and/or the short PUCCH, and information about the method of multiplexing the long PUCCH and the short PUCCH in the same slot.

The transmitting/receiving sections 203 may transmit, to the radio base station 10, capability information about the capability for multiplexing the short PUCCH and the long PUCCH in the above predetermined period.

Figure 11:
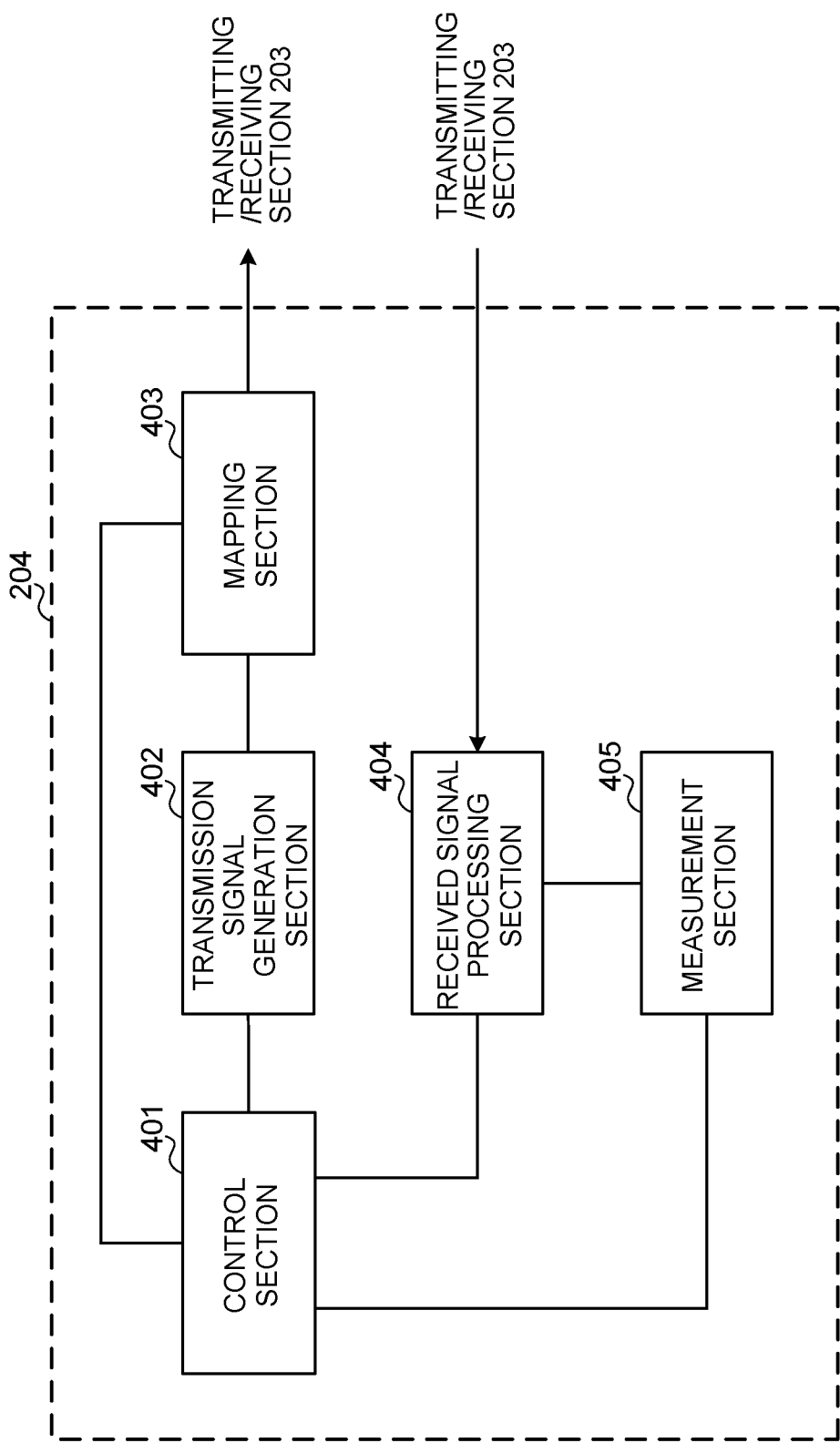
FIG. 11 is a diagram to show an exemplary functional structure of a terminal according to one embodiment of the present invention.

FIG. 11 is a diagram to show an example of a functional structure of a terminal according to one embodiment of the present invention. Note that, although this example primarily shows functional blocks that pertain to characteristic parts of the present embodiment, the terminal 20 has other functional blocks that are necessary for radio communication as well.

The baseband signal processing section 204 provided in the terminal 20 at least has a control section 401, a transmission signal generation section 402, a mapping section 403, a received signal processing section 404 and a measurement section 405. Note that these configurations have only to be included in the terminal 20, and some or all of these configurations may not be included in the baseband signal processing section 204.

The control section 401 controls the whole of the terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

In one or more CCs, the control section 401 controls the transmission and/or reception of signals using a first TTI (for example, a long TTI, a subframe, a slot, etc.) and a second TTI (for example, a short TTI, an sTTI, a minislot, etc.) having a shorter TTI duration than the first TTI.

For example, the control section 401 may decide whether or not to multiplex a short uplink control channel (short PUCCH) having a short time length and a long uplink control channel (long PUCCH) having a longer time length than the short uplink control channel, in a predetermined period.

The control section 401 may make this decision based on configuration information acquired from the received signal processing section 404. Also, the predetermined period may be one or more TTIs, and may be, for example, one or more slots, one or more minislots, and/or the like.

When deciding, based on the above configuration information, to multiplex the short PUCCH and the long PUCCH in the above predetermined period, the control section 401 may exert control so that UCIs corresponding to different UCI types are transmitted in the short PUCCH and the long PUCCH.

When the control section 401 decides, based on the above configuration information, to multiplex the short PUCCH and the long PUCCH in the predetermined period, and resources for the short PUCCH and resources for the long PUCCH overlap at least partially, the control section 401 may exert control so that one of these PUCCHs is dropped, or overlapping resources of one of these PUCCHs are punctured.

When the control section 401 decides, based on the above configuration information, to multiplex the short PUCCH and the long PUCCH in the above predetermined period, and is configured to transmit these short PUCCH and long PUCCH in the above predetermined period, the control section 401 may exert control so that one of these PUCCHs is dropped.

The control section 401 may exert control so that capability information about the capability for multiplexing the short PUCCH and the long PUCCH in the above predetermined period (that is, capability information as to whether or not this capability is provided). In this case, the configuration information used to make the above decision may be configured by, for example, the radio base station 10, based on the capability information.

The control section 401 may control the generation and/or mapping of UCI to transmit in a short PUCCH and/or a long PUCCH. The control section 401 may exert control so that, for example, in the short PUCCH and the long PUCCH, UCI corresponding to the same UCI type is transmitted, or UCIs corresponding to different (separate) UCI types are transmitted. The control section 401 may select PUCCH resources for the short PUCCH and/or the long PUCCH.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 12:
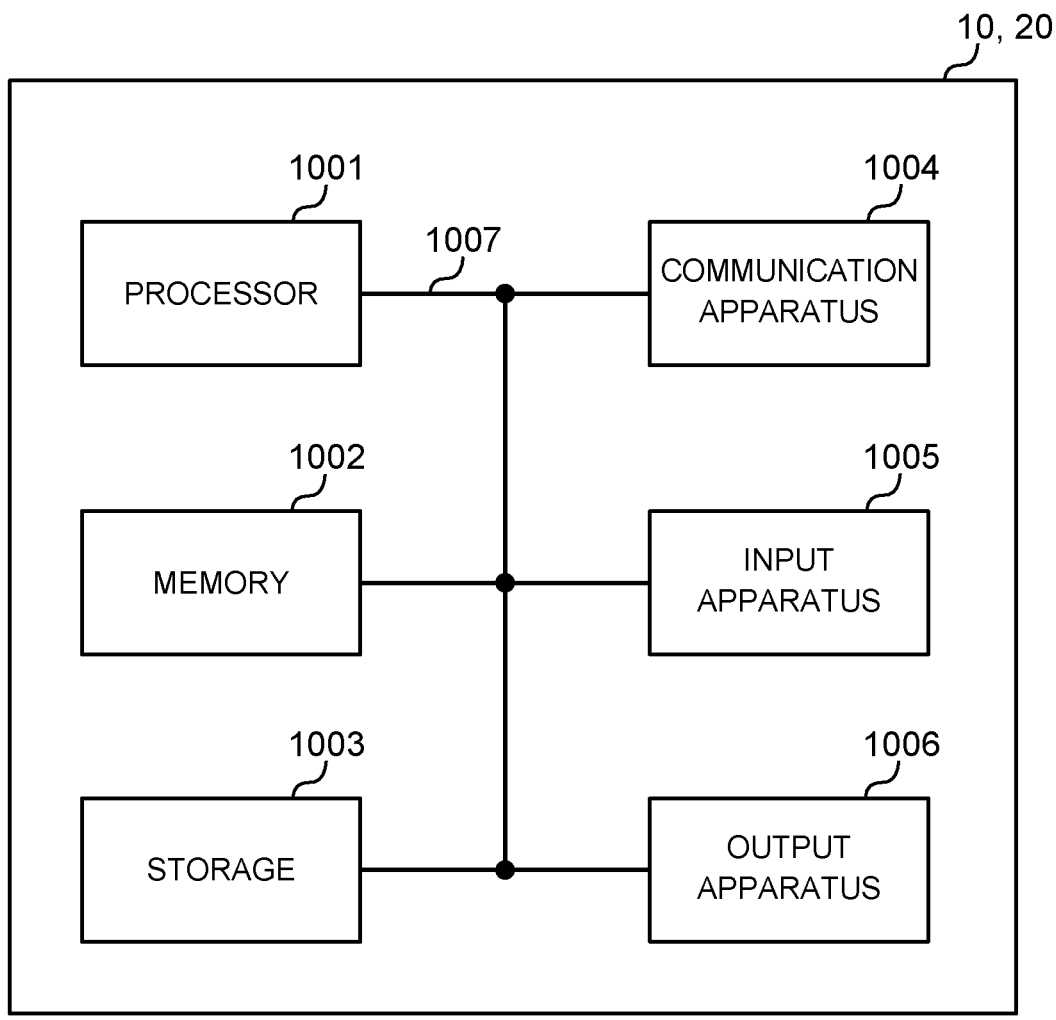
FIG. 12 is a diagram to show an exemplary hardware structure of a radio base station and a terminal according to one embodiment of the present invention.

For example, the radio base station, terminals and so on according to embodiments of the present invention may function as a computer that executes the processes of the radio communication method of the present invention. FIG. 12 is a diagram to show an exemplary hardware structure of a radio base station and a terminal according to one embodiment of the present invention. Physically, the above-described radio base stations 10 and terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on two or more processors. Note that the processor 1001 may be implemented with one or more chips.

Each function of the radio base station 10 and the terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may b e referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each terminal) to allocate to each terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as terminals. For example, each aspect/embodiment of the present invention may be applied to a configuration in which communication between a radio base station and a terminal is replaced with communication among a plurality of terminals (D2D (Device-to-Device)). In this case, terminals 20 may have the functions of the radio base stations 10 described above. In addition, terms such as "uplink" and "downlink" may be interpreted as "side." For example, an uplink channel may be interpreted as a side channel.

Likewise, the terminals in this specification may be interpreted as radio base stations. In this case, the radio base stations 10 may have the functions of the terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access." As used herein, 2 elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:
1. A terminal comprising:
a transmitter that transmits capability information about whether the terminal is capable of multiplexing in a given time a short uplink control channel format having a time duration and a long uplink control channel format having a longer time duration than the time duration of the short uplink control channel format, in time-division-multiplexing (TDM);
a receiver that receives higher layer signaling and downlink control information used for multiplexing the short uplink control channel format and the long uplink control channel format in the given time, wherein the higher layer signaling and the downlink control information are determined based on the capability information; and
a processor that multiplexes the short uplink control channel format and the long uplink control channel format in the given time based on the higher layer signaling and the downlink control information,
wherein frequency hopping is applied to the long uplink control channel format.
2. The terminal according to claim 1, wherein the given time is a one slot.

3. The terminal according to claim 2, wherein the uplink control information includes HARQ-ACK.

4. The terminal according to claim 1, wherein the uplink control information includes HARQ-ACK.

5. A radio communication method for a terminal, comprising:
   transmitting capability information about whether the terminal is capable of multiplexing in a given time a short uplink control channel format having a time duration and a long uplink control channel format having a longer time duration than the time duration of the short uplink control channel format, in time-division-multiplexing (TDM);
   receiving higher layer signaling and downlink control information used for multiplexing the short uplink control channel format and the long uplink control channel format in the given time, wherein the higher layer signaling and the downlink control information are determined based on the capability information; and
   multiplexing the short uplink control channel format and the long uplink control channel format in the given time based on the higher layer signaling and the downlink control information,
   wherein frequency hopping is applied to the long uplink control channel format.

6. A base station comprising:
   a receiver that receives capability information about multiplexing in a given time a short uplink control channel format having a time duration and a long uplink control channel format having a longer time duration than the time duration of the short uplink control channel format, in time-division-multiplexing (TDM);
   a transmitter that transmits higher layer signaling and downlink control information used for multiplexing the short uplink control channel format and the long uplink control channel format in the given time, wherein the higher layer signaling and the downlink control information are determined based on the capability information; and
   a processor that multiplexes the short uplink control channel format and the long uplink control channel format in the given time based on the higher layer signaling and the downlink control information,
   wherein frequency hopping is applied to the long uplink control channel format.

7. A system comprising a terminal and a base station, wherein:
   the terminal comprises:
      a first transmitter that transmits capability information about multiplexing in a given time a short uplink control channel format having a time duration and a long uplink control channel format having a longer time duration than the time duration of the short uplink control channel format, in time-division-multiplexing (TDM);
      a first receiver that receives higher layer signaling and downlink control information used for multiplexing the short uplink control channel format and the long uplink control channel format in the given time, wherein the higher layer signaling and the downlink control information are determined based on the capability information; and
      a processor that multiplexes the short uplink control channel format and the long uplink control channel format in the given time based on the higher layer signaling and the downlink control information; and
   the base station comprises:
      a second receiver that receives the capability information; and
      a second transmitter that transmits the higher layer signaling and downlink control information, and
   wherein frequency hopping is applied to the long uplink control channel format.

* * * * *